United States Patent
Jackl et al.

(10) Patent No.: US 11,104,266 B2
(45) Date of Patent: Aug. 31, 2021

(54) CENTRAL PIVOT REGION

(71) Applicant: ZKW Group GmbH, Wieselburg (AT)

(72) Inventors: Christian Jackl, Wieselburg (AT);
Martin Hungendorfer, Häusling/Dunkelsteinerwald (AT);
Matthias Mayer, Mank (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 16/957,906

(22) PCT Filed: Nov. 12, 2018

(86) PCT No.: PCT/EP2018/080880
§ 371 (c)(1),
(2) Date: Jun. 25, 2020

(87) PCT Pub. No.: WO2019/129415
PCT Pub. Date: Jul. 4, 2019

(65) Prior Publication Data
US 2021/0221278 A1  Jul. 22, 2021

(30) Foreign Application Priority Data

Dec. 27, 2017  (EP) .................................. 17210716

(51) Int. Cl.
*B60Q 1/076* (2006.01)
*B60Q 1/068* (2006.01)
*F21S 41/657* (2018.01)

(52) U.S. Cl.
CPC .......... *B60Q 1/076* (2013.01); *B60Q 1/0683* (2013.01); *B60Q 2200/32* (2013.01); *B60Q 2200/36* (2013.01); *F21S 41/657* (2018.01)

(58) Field of Classification Search
CPC .... B60Q 1/068; B60Q 1/0683; B60Q 1/0686; B60Q 1/076; B60Q 2200/32; B60Q 2200/36; F21S 41/657
See application file for complete search history.

(56) References Cited

U.S. PATENT DOCUMENTS 10,399,479 B2   9/2019  Jakobsmeyer

FOREIGN PATENT DOCUMENTS

| DE | 102009033910 B4 | 7/2020 |
| EP | 2796320 A1 | 10/2014 |

OTHER PUBLICATIONS

PCT International Search Report and Written Opinion for PCT/EP2018/080880, dated Jan. 4, 2019 (16 pages).

*Primary Examiner* — Robert J May
(74) *Attorney, Agent, or Firm* — Eversheds Sutherland (US) LLP

(57) ABSTRACT

To set light modules or other optical components in a headlight, in particular a motor vehicle headlight, a setting device (3) is configured for jointly adjusting the support frames (11, 21), in which the light modules or optical components are held, by pivoting in each case about at least one axis (a1, a2) relative to the housing of the headlight. The setting device (3) comprises a gearing, which is actuated by an actuator (31) and is connected to the support frames (11, 21) by respective articulated couplings. In a multishell-concentric ball-and-socket joint (30), a connection element (34) of the actuator (31) and connection elements (14, 24) of the support frame (11, 21) are concentrically coupled. The connection element (14) of the first support frame (11) is rigidly connected to the first support frame (11), while for the other support frame(s) (21) the associated connection element (24) is connected directly or by way of the gearing to the articulated coupling (29) of the support frame.

8 Claims, 2 Drawing Sheets

CENTRAL PIVOT REGION

The present invention relates to a headlamp, in particular a motor-vehicle headlamp, having a housing, a number of supporting frames, which are mounted adjustable in the housing and in which an (at least one) optical component is held respectively, i.e. a first supporting frame and at least one further supporting frame, and an adjusting device, which is configured for the common adjustment of the supporting frames by pivoting about at least one axis respectively, relative to the housing, and which comprises a gear mechanism actuated by an actuating drive, which gear mechanism is connected to the supporting frames by means of respective joint couplings.

Motor-vehicle headlamps with adjustable optical components, adjustable in particular for adjusting the direction of the light exiting from the headlamp, are well-known from prior art. The pivotability of a light module may, for example, be used for setting a headlamp level of the headlamp (horizontal pivoting) or for guiding in the case of a cornering beam (vertical pivoting). The optical components of the headlamp of the invention are preferably light modules; but an optical component may (respectively) generally be in the form of an illuminating component, such as a lamp unit, laser light source or a complete light module, or a light-shaping component, such as a reflector, a lens, or combinations of lenses and/or reflectors. Furthermore, sensors (radar, lidar, infrared emitters/receivers, etc.) and cameras for detecting road users, states of the carriageway and people may be adjusted therewith.

For example, a motor-vehicle headlamp with light modules, which can be pivoted about two axes, is described in EP 2 796 320 A1, which light modules are connected to one another in a movable manner by means of a coupling mechanism, wherein the coupling mechanism contains a two-sided lever and two coupling rods, which form a kinematic coupling chain, in order to enable a common adjustment of the two light modules. In addition, the bearing point of the lever can be adjusted, which allows an adjustment of the second light module without a feedback effect on the first light module.

However, the known adjusting systems provide a large number of components in the coupling mechanism, which may impair the reliability and precision of the coupling mechanism. In addition, often the problem arises that the light modules or supporting frames are not adjusted to the same extent by the actuating drive, thus giving rise to what is known as an angle error between the adjustment angles of the (two or more) light modules or supporting frames.

It is, therefore, an object of the present invention to provide a headlamp with an improved adjusting device, in order to overcome the disadvantages mentioned. In particular, the adjusting device should enable a simultaneous adjustment of the two or more optical components (light modules in particular), wherein a potential for compensating or avoiding angle errors should be achieved.

This object is achieved by a headlamp or an adjusting device of the type mentioned at the beginning, in which the gear mechanism has a ball-and-socket joint of concentric multiple-shell type, in which a connecting element of the actuating drive and connecting elements, each associated with a respective one of the supporting frames, are concentrically coupled, wherein the connecting element of the first supporting frame is rigidly connected to the first supporting frame, whereas, for the supporting frame or each of the further supporting frames (as the case may be), the respectively associated connecting element is connected to the joint coupling of the respective supporting frame directly or by means of a gear mechanism.

According to this solution according to the invention, the actuating drive is connected to a node of the gear mechanism of the adjusting device, namely to a concentric multi-shell ball-and-socket bearing. The setting mechanisms of the two or more light modules or supporting frames are simultaneously coupled to the node by means of concentric connecting elements. Thus, at the node an onion-layer structure of the joint components is obtained.

In addition, this technical solution reduces the number of movable components in the gear mechanism of the adjusting device, thus increasing reliability and improving the precision of the adjustment achievable for the light module (generally for the optical component). Last not least, the layout of the concentric ball-and-socket joint according to the invention provides for that the adjustment movement of the actuating drive affects the adjustment of the thus-adjusted supporting frames (light modules) in the same way. Thus, the invention dispenses with angle errors to a large extent.

In an expedient development, it is additionally beneficial for preventing angle errors, where the ball-and-socket joint is accommodated in a recess of the first supporting frame. This recess is preferably provided on an outer side of the supporting frame, in order to prevent the optical component held in the supporting frame from being partially or completely covered.

The second or, in general, each of the further supporting frames may be connected to the respectively associated connecting element via a sub-gear mechanism. As a result, a simultaneous adjustment of the supporting frames can be achieved by means of the adjusting device, wherein the deflection of the actuating drive can be transformed in a manner adapted to the respective supporting frames (distance amount, direction). In particular, this may additionally facilitate the prevention of angle errors.

Therein, a sub-gear mechanism of this type may have an adjusting device, which is configured to adjust the location of the bearing of a coupling component of the sub-gear mechanism, and an additional adjustment of the relevant supporting frame results, without this affecting the other supporting frame(s) through the mechanics of the adjusting device according to the invention. The sub-gear mechanisms used here are preferably realized as coupling mechanisms, particularly as an open kinematic chain.

In a beneficial implementation of the multiple-shell ball-and-socket joint according to the invention, it may be provided that the connecting element of the actuating drive is realized as a joint ball arranged at the centre of the ball-and-socket joint. This joint ball may, in particular, be realized as an end piece of an actuating rod of the actuating drive; it may be e.g. fixed thereto or may be formed integrally therewith. To obtain a operationally more reliable structure of the ball-and-socket joint, a further embodiment is advantageous in particular, in which, in the mounted state of the ball-and-socket joint, the connecting element of the first supporting frame together with (at least) one further connecting element surrounds the joint ball, wherein pulling the joint ball out of the ball-and-socket joint is prevented by positive engagement.

The optical components, which are held in the supporting frames, may wholly or partly be light modules with at least one light source in each case.

The invention, including further developments and advantages, is hereinafter explained in more detail, based on an embodiment which is illustrated in the attached drawings. In the drawings.

It is understood that the embodiment described here is merely used for illustration and is not to be considered as limiting for the invention; but rather any configuration that the person skilled in the art may find on the basis of the description, will fall within the protective scope of the invention, wherein the protective scope is determined by the claims.

In the following figures, for the purposes of simpler explanation and illustration, the same reference numbers are used for same or comparable elements. In addition, the reference numbers used in the claims are intended to merely facilitate the readability of the claims and the understanding of the invention, and in no way are of limiting nature to the protective scope of the invention. Where terms of spatial location such as "top", "above", "below", "front", "horizontal", "vertical" and like identifiers are used in this disclosure—particularly in the claims—they relate merely to an orientation of the headlamp as depicted here in the present drawings, and it is understood that the orientation in an actual installation position of a headlamp or the components thereof may be different, without this being capable of forming the basis for a departure from the protective scope.

Figure 1:
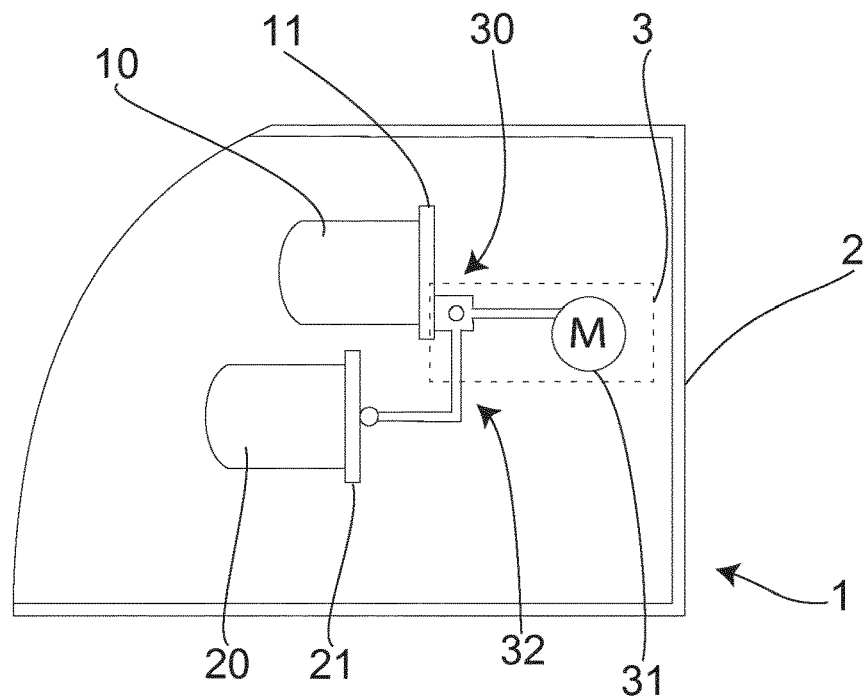
FIG. 1 shows a headlamp having an adjusting device according to the embodiment of the invention, in a schematic illustration.

In FIG. 1, a headlamp according to the invention is illustrated in a strongly schematized illustration, which headlamp is referenced as a whole with the reference number 1. The headlamp 1 of the illustrated exemplary embodiment realizes a motor-vehicle headlamp. The headlamp 1 comprises a housing 2, the material (e.g. plastic) and shaping of which may be realized in accordance with the respective application and is of no further importance for the invention. The headlamp 1 furthermore comprises a plurality of—two in the embodiment shown—light modules 10, 20, which, in the embodiment shown, represent respective (adjustable) optical components and which are held in the respectively assigned supporting frame 11, 21. For example, the first light module is realized as an LED dipped-beam module, and the second light module 20 is realized as a laser main-beam module; of course, the light modules may be of a different type in other embodiments of the invention and may in particular also contain different light functions or contain further light-source types (e.g. xenon).

Figure 3:
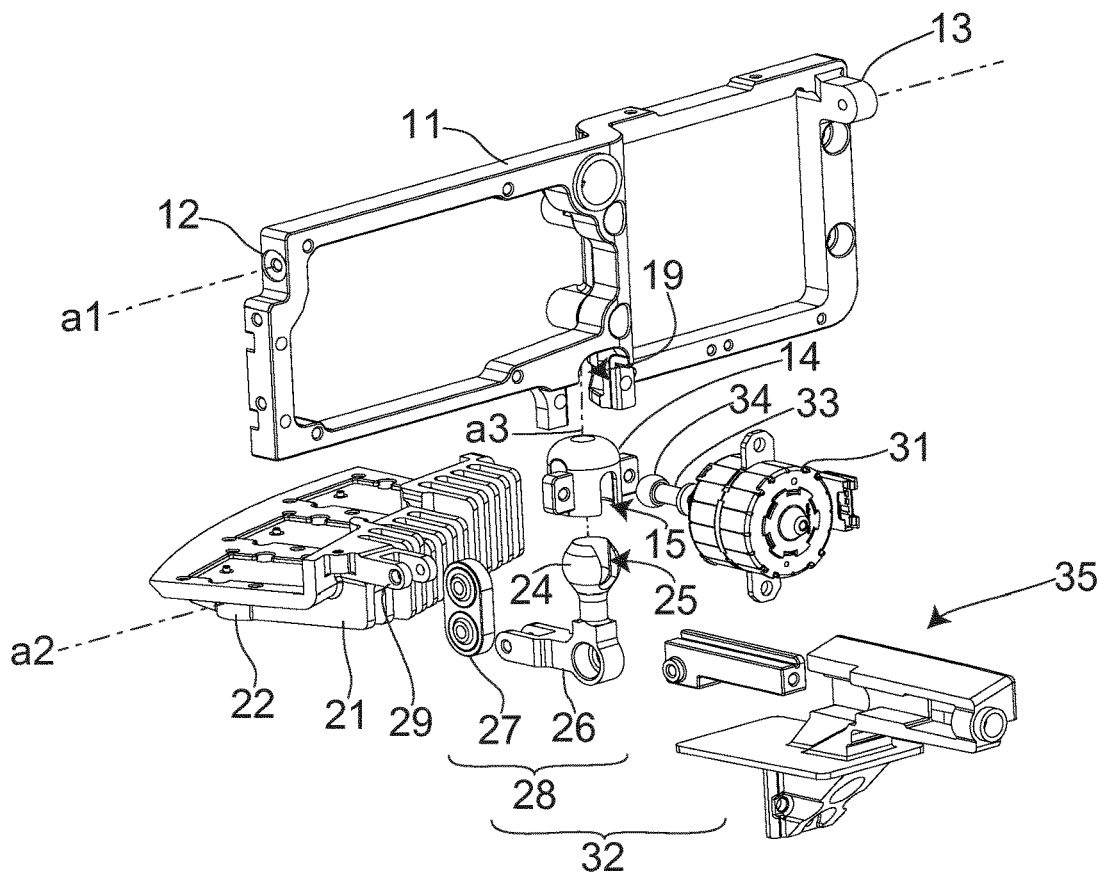
FIG. 3 shows the adjusting device of FIG. 2 in a perspective exploded view.

Each of the supporting frames 11, 21 is arranged inside the housing 2 mounted about at least one pivot axis a1, a2 (FIG. 3). For example, an inclination of the light modules can be adjusted by means of a pitching movement about a horizontal axis, in order to thus modify the headlamp level of the light images, which are generated in front of the headlamp using the light modules—so-called headlamp level regulation. An adjusting device 3 is used for simultaneous adjustment of the supporting frame 11, 21 and the light modules 10, 20 held therein for headlamp level regulation. The adjusting device 3 includes an actuating drive 31, for example in the form of an electrically driven motor, which actuates a gear mechanism 32, which in turn acts on the supporting frames 11, 21.

Figure 2:
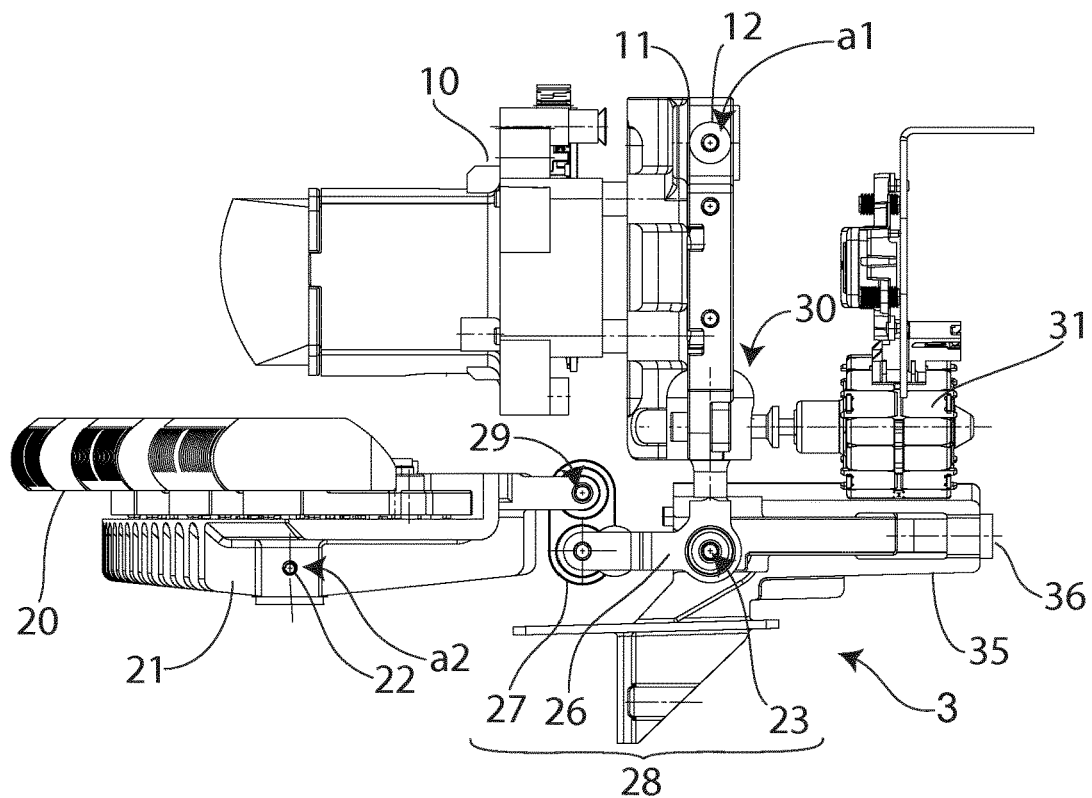
FIG. 2 shows the adjusting device of the embodiment including the light modules held therein in a side view.
Figure 4:
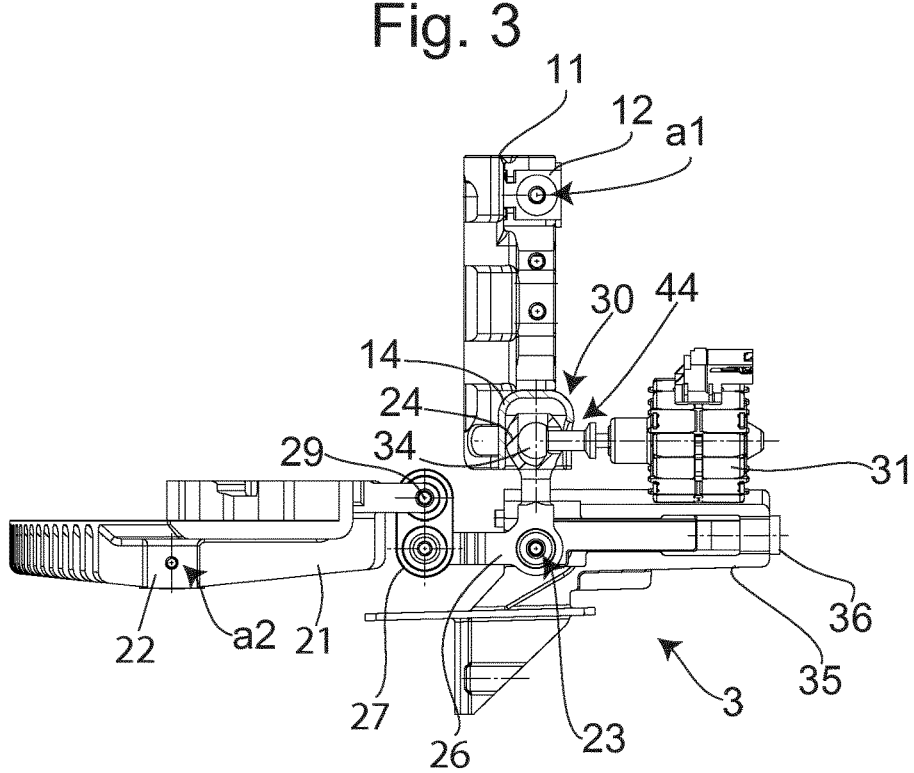
FIG. 4 shows the adjusting device of FIG. 2 in a side view.

With reference to FIGS. 2 to 4, the first light module 10 is held in a first supporting frame 11 and fixed therein. The first supporting frame 11 is mounted via e.g. two bearing points 12, 13 in the housing 2 and pivotable about a preferably horizontal axis a1 defined by the bearing points 12, 13, as a result of which a tilting, particularly inclination, of the light module 10 can be effected. The position (inclination) with respect to the axis a1 can be adjusted by means of a third bearing point of the supporting frame 11, lying outside of this axis, namely the coupling point 19, as is described in more detail below. In a similar manner, the second light module 20 is held in a second supporting frame 21 and fixed therein, for example below the first light module 10. It is mounted by means of e.g. two bearing points (of which only one bearing point 22 is visible in the figures) in the housing 2; these bearing points define a preferably horizontal axis a2, about which the second supporting frame 21 is pivotable. Thus, the second light module 20 may also be inclined (tilted) about the axis a2, wherein the position (inclination) can be adjusted with respect to the axis a2 by means of a coupling point 29, located outside of this axis, in the form of a joint coupling 29 of the supporting frame 21, as is explained in more detail below.

The second supporting frame 21 is also used as a heat sink for the second light module 20 and preferably is made of metallic material, e.g. aluminium. The first supporting frame 11 can be made of aluminium or plastic material. In other layout variants (not shown), the first supporting frame may therefore also be used as heat sinks in each case like the second supporting frame, or both supporting frames are provided without a cooling action. The material of the supporting frames is selected depending on the desired application, e.g. plastic, aluminium or other metallic material or light metal.

According to the invention, an adjusting device 3 may be provided with an actuating drive and a gear mechanism 32 for adjusting the inclined position of the two supporting frames 11, 21, which gear mechanism is connected to the supporting frames 11, 21 at the coupling points 19, 29 mentioned by means of respective joint couplings.

The actuating drive 31 is an electrically operated linear motor for example. The actuating drive 31 drives e.g. a horizontally running actuating rod 33, at the end of which a joint ball 34 is provided. The joint ball 34 engages into a ball-and-socket joint 30, by means of which the movement of the actuating drive 31 or the position of the actuating rod 33 is transmitted to the gear mechanism 32 including the first supporting frame 11, as described below. Instead of an electric drive, other solutions may also be expedient, e.g. of a hydraulic type or by means of a piezoelectric motor, or a manual drive, e.g. by means of a handwheel.

According to the invention, the ball-and-socket joint 30 forms a node of the gear mechanism 32 which, in a gear-moderated manner, transmits the actuating movement, or more precisely actuating deflection, as exerted by the actuating drive 31 to corresponding kinematics of the coupling points 19, 29 of the supporting frames. In addition to the joint ball 34, the ball-and-socket joint 30 contains connecting elements 14, 24, assigned to the supporting frames 11, 21 respectively, in a concentric arrangement. In the embodiment shown, the ("second") connecting element 24, which is assigned to the second supporting frame 21, is layouted as an inner socket and forms a part of an L-shaped coupling component 26. The inner socket 24 has a cup-like shape, the inner side of which forms a ball-socket-like joint surface, which forms a ball socket for accommodating the joint ball 34. An inner joint connection is produced as a result. The inner socket 24 additionally has a ball-like joint surface on its outer side, which is concentric to the inwardly facing ball-socket-like joint surface. The inner socket 24 is accommodated in the ("first") connecting element 14 of the first supporting frame 11, which is realized as an outer socket, and thus forms an outer joint connection. In this way, the inner and the outer joint connection together form the multiple-shell concentric ball-and-socket joint according to the invention. The sockets 14, 24 are illustrated in section in FIG. 4, in order to illustrate the position of the components in the ball-and-socket joint 30.

The first connecting element 14 is inserted in the coupling point 19 of the first supporting frame and rigidly fastened there. Due to the rigid fastening, a direct mounting in the node of the ball-and-socket joint 30, which efficiently prevents angle errors. The coupling point 19 is preferably realized as a recess on the outer side of the first supporting frame 11, for example on the underside thereof, and preferably centrally on the supporting frame.

Expediently, the outer socket 14 may have a cup-like shape with a lateral slot 15, in order to enable the actuating rod 33 access to the interior from the side. A lateral slot 25 may similarly be provided in the cup-like shape of the inner socket 24, through which slot the actuating rod 33 runs. The two cup-like shapes of the sockets 14, 24 are preferably coaxial along an axis a3, which runs vertically for example. In the course of mounting, the two sockets 14, 24 are plugged into one another by means of a movement along this axis a3, wherein the two slots 15, 25 are of course aligned above one another beforehand and the spherical ball 34 is inserted, and thereafter the two sockets enclose the spherical ball 34 at the centre of the ball-and-socket joint 30, wherein the two slots 15, 25 lie above one another in the mounted state of the joint and form a window 44, through which the actuating rod 33 runs. The window 44 is smaller than the diameter of the spherical ball 34. Thus, the spherical head 34 is secured by positive engagement against being pulled out of the ball-and-socket joint 30, which is formed by the components 14, 24, 34. By contrast, the actuating drive acts in a direction transverse to the axis a3. The movement of the actuating drive therefore effects a kinematic forced movement of the ball-and-socket joint and the components fastened therein, i.e. the connecting elements 14, 24.

As mentioned above, the second connecting element 24 is part (here as inner socket) of a coupling component 26. This transforms the horizontal movement of the inner socket 24 into a vertical movement and is connected by means of a coupling element 27 to the joint coupling 29 of the second supporting frame 21. As a result, a sub-gear mechanism is formed in the form of a coupling mechanism 28, which transmits the deflection of the ball-and-socket joint 30, more precisely the socket 24, to the joint coupling 29 and thus converts the same to a pivot movement of the second supporting frame 21. The coupling element 27 allows the play between coupling component 26 and joint coupling 29 in the horizontal direction during the vertical movement at this joint connection.

In a simplified layout variant, the coupling element 27 may be dispensed with or in one piece with the coupling component; this additionally reduces the number of gear components. Thus, in this variant, the second connecting element 24 is directly connected, as coupling component 26, to the joint coupling 29 of the second supporting frame. Play at the joint coupling 29, which is required if appropriate, may be achieved by means of other measures, e.g. a slotted guide.

In the embodiment shown, the components 26, 27 of the coupling mechanism 28 are produced for example from steel (e.g. stainless steel), just like the actuating rod 33 including the spherical head 34, whilst the outer socket 14 is e.g. made of aluminium.

The gear mechanism 32 may, as shown in FIGS. 2 to 4, additionally have an adjusting device 35 for the coupling mechanism 28. The adjusting device 35 forms e.g. an adjustable bearing (centre of rotation) 23 of the coupling component 26. An adjustment of the relative setting of the light modules 11, 21 with respect to one another results due to a displacement of the position of the bearing 23. The adjusting device 35 of the embodiment shown is adjusted manually, e.g. during the mounting procedure of the headlamp 1 by means of a handwheel 36; of course, in a variant, the adjusting device may also be driven in a different manner, e.g. by means of an actuator. The adjusting device 35 is for example produced from aluminium and may be realized in any desired manner known to the person skilled in the art, for example as described in DE 10 2010 022 847 of the applicant.

If desired, in a different embodiment of the invention, further devices may be provided, in order to be able to execute an additional pivoting of the supporting frame about different axes, for example about a vertical axis (not shown), in order to enable lateral adjustment of the location of the light image.

It is understood that the invention is not limited to the exemplary embodiment shown here. In particular, it is easy to see that the components 14, 24, 34, may be in a different sequence with regards to their "onion-layer" arrangement in the multiple-shell ball-and-socket joint according to the invention. For example, the two sockets 14, 24 may be exchanged with one another, so that the socket of the first connecting element lies in the socket of the second; furthermore, the inner socket would be rigidly connected to the coupling point of the assigned supporting frame. In another variant, the connecting element of the drive may be realized as a socket, whilst a connecting element of one of the supporting frames is a central joint ball. In addition, the rollers of the two light modules or supporting frames may be swapped with one another.

The invention claimed is:

1. A motor-vehicle headlamp, comprising:
   a housing (2);
   a plurality of supporting frames (11, 21), which are mounted in an adjustable manner in the housing and in which respective optical components (10, 20) are held, namely a first supporting frame (11) and at least one further supporting frame (21); and
   an adjusting device (3), configured for common adjustment of the supporting frames (11, 21) by pivoting about at least one axis (a1, a2) respectively, relative to the housing (2), wherein the adjusting device (3) comprises a gear mechanism (32) actuated by an actuating drive (31), which gear mechanism is connected to the supporting frames (11, 21) by means of respective joint couplings,
   wherein the gear mechanism (32) has a multiple-shell concentric ball-and-socket joint (30), in which a connecting element (34) of the actuating drive (31) and connecting elements (14, 24) which are each associated with a respective one the supporting frames (11, 21) are concentrically coupled,
   wherein the connecting element (14) of the first supporting frame (11) is rigidly connected to the first supporting frame (11), and wherein, for the or each of the further supporting frame(s) (21), the connecting element (24) associated therewith is connected to the joint coupling (29) of the respective supporting frame directly or by means of a gear mechanism.

2. The headlamp according to claim 1, wherein the ball-and-socket joint (30) is accommodated in a recess (19) of the first supporting frame (11).

3. The headlamp according to claim 1, wherein the or each of the further supporting frames (21) is connected to the respective connecting element (24) by means of a sub-gear mechanism (28).

4. The headlamp according to claim 3, wherein the sub-gear mechanism (28) comprises an adjusting device (35) configured to adjust the location (23) of the bearing of a coupling component (26) of the sub-gear mechanism.

5. The headlamp according to claim 3, wherein the sub-gear mechanism (28) is realized as a coupling mechanism.

6. The headlamp according to claim 1, wherein the connecting element (34) of the actuating drive (31) is realized as a joint ball arranged at the centre of the ball-and-socket joint (30).

7. The headlamp according to claim 6, wherein, in the mounted state of the ball-and-socket joint (30), the connecting element (14) of the first supporting frame (11) together with a further connecting element (24) surrounds the joint ball (34), wherein a pulling the joint ball (34) out of the ball-and-socket joint is prevented by positive engagement.

8. The headlamp according to claim 1, wherein, that the optical components (10, 20) are light modules having at least one light source.

\* \* \* \* \*